(12) United States Patent
Atay Onat et al.

(10) Patent No.: US 9,071,323 B2
(45) Date of Patent: Jun. 30, 2015

(54) SYSTEM AND METHOD OF COOPERATIVE AND OPPORTUNISTIC RELAYING OF TRANSMISSIONS REQUIRING RELAY COORDINATION

(75) Inventors: Furuzan Atay Onat, Ankara (TR); Guven Yenihayat, Ankara (TR); Ahmet Ertugrul Kolagasioglu, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 50 days.

(21) Appl. No.: 13/884,971

(22) PCT Filed: Mar. 20, 2012

(86) PCT No.: PCT/IB2012/051327
§ 371 (c)(1),
(2), (4) Date: May 13, 2013

(87) PCT Pub. No.: WO2012/156831
PCT Pub. Date: Nov. 22, 2012

(65) Prior Publication Data
US 2014/0057553 A1    Feb. 27, 2014

(30) Foreign Application Priority Data
May 13, 2011    (TR) .............................. a 2011 04728

(51) Int. Cl.
*H04B 7/155*    (2006.01)
(52) U.S. Cl.
CPC ............ *H04B 7/155* (2013.01); *H04B 7/15592* (2013.01)

(58) Field of Classification Search
CPC ............... H04B 7/155; H04B 1/15592; H04B 7/15507; H04B 7/15521; H04B 7/15514; H04B 7/15528; H04B 7/15535; H04B 7/15542; H04B 7/1555; H04B 7/15557; H04B 7/15564; H04B 7/15571; H04B 7/15578
USPC ......... 455/7, 11.1, 13.1, 9, 16, 500, 509, 515, 455/67.11, 67.16, 552.1, 115.1, 150.1, 455/151.1; 370/315, 329, 327, 281, 312, 370/254
See application file for complete search history.

(56) References Cited

U.S. PATENT DOCUMENTS

| 2004/0095920 A1* | 5/2004 | Lippman et al. ............... 370/351 |
| 2009/0175214 A1* | 7/2009 | Sfar et al. ...................... 370/315 |
| 2010/0054155 A1* | 3/2010 | Cai et al. ........................ 370/254 |
| 2011/0092154 A1* | 4/2011 | Horiuchi et al. .................. 455/7 |
| 2011/0216676 A1* | 9/2011 | Li et al. .......................... 370/281 |
| 2013/0121238 A1* | 5/2013 | Yamada et al. ............... 370/327 |

\* cited by examiner

*Primary Examiner* — Tan Trinh
(74) *Attorney, Agent, or Firm* — Gokalp Bayramoglu

(57) ABSTRACT

The present invention relates to a cooperative relaying system (1) and method (100) in which many different units in the network can be used in a common channel and time interval by way of repetition without requiring additional relay coordination in cases where the connection between the source and the destination is insufficient in wireless communication networks. The inventive system (1) and method (100) increases the probability of the transmission of the source data with the maximum diversity gain requiring no coordination thanks to determining the relays (3) without pre-selection and keeping the amount of band spent to a minimum.

10 Claims, 3 Drawing Sheets

SYSTEM AND METHOD OF COOPERATIVE AND OPPORTUNISTIC RELAYING OF TRANSMISSIONS REQUIRING RELAY COORDINATION

FIELD OF THE INVENTION

The present invention relates to a cooperative relaying system and method in which many different units in the network can be used in a common channel and time interval by way of repetition without requiring additional relay coordination in cases where the connection between the source and the destination is insufficient in wireless communication networks.

BACKGROUND OF THE INVENTION

Currently, in cooperative relaying, different options are presented for relay selection and transmission of the selected relays to the destination. There are two ways for relay selection. The first one of these is relaying with pre-selected relays and the second is relaying with post-selected relays.

In relaying with pre-selected relays, one or more relays are selected before the source begins transmission. While this selection can be performed only once during the planning stage (fixed relay), it can also be updated at certain intervals according to the mobility in the network and the average channel quality. In practice, these updates are carried out based on the success rate of the communications made previously between the nodes, and they are reported to the required nodes as control information.

In relaying with post-selected relays, all of the nodes receiving signal with adequate quality from the source can be used as relays. In this case, units which will be used as relays are chosen after the source executes transmission. In both relay selection methods, in case of a plurality of relays performing repetition, these relays can transmit to the destination in different channels or in a common channel and time interval.

Various methods are introduced for transmission of the selected relays in a common channel and time interval. The use of distributed space-time coding is proposed to enable the destination to separate the signals sent from the relays in a common channel and time interval. Another method that is proposed is distributed beamforming. In this method, the relays estimate their channels towards the destination and perform transmission in a way that all the relay signals reach the destination with the same phase.

Selecting a fixed relay during the planning stage makes the system dependent on a single relay. It is not possible to reach the diversity gain present in the network using a fixed relay. A certain gain can be achieved by placing the selected relay to geographically advantageous locations. However this generally makes it difficult to reach the selected location. Additionally, placing the relay to a preplanned location is not preferred especially for ad hoc networks and military communication systems.

Methods requiring internodal coordination bring disadvantages in several aspects. The messaging needed for coordination leads to an additional traffic load and additional delay. Furthermore, when the purpose of the coordination is adapting to the channel conditions which changes continuously due to the nature of the wireless communication environment, as in relay selection, from time to time it would not be possible to coordinate rapidly enough to adapt to these conditions, which causes a decrease in the performance.

In pre-selected relaying methods, diversity gain decreases when the source-relay and/or relay-destination channels are weak. Since the possibility of the presence of at least one relay that has strong channels both to the source and to the destination increases in relaying methods with relay post-selection, these methods provide more diversity gain than the relaying methods with relay pre-selection. Another disadvantage of the relaying with pre-selected relays is that it requires coordination between the nodes for relay selection.

Increasing the number of relays that receive sufficient signal from the source and perform repetition increases the diversity gain. Relays performing repetition by transmitting in different channels increases the necessary time or band use for unit information and as a result decreases the end-to-end communication efficiency. In cases where the relays are determined after the source's transmission, since the number of the relays and the channels required for the repetition changes continuously, performing repetition in different channels will further increase the need for coordination.

Efficient operation of the methods which allow transmission of relays in a common channel and time interval, such as distributed space-time coding and distributed beam-forming, can be possible by pre-selected relays. Both of these methods require precise synchronization between the units for performing repetition in the same time interval. Further coordination is needed for fulfilling this requirement. A receiver structure which allows transmission in a common channel and time interval is suggested for use at the destination for relaying with post-selected relays. However operation of this receiver is based on the preconditions that at the destination both precise synchronization and the knowledge of the channel qualities from the relays towards the destination are present. Fulfilling these preconditions also require further coordination.

The United States patent document no. US010260240 discloses a cooperative relaying method and system for asynchronous networks. In the said invention, similar to the invention we are proposing herein, a system for transmitting the source's message to the destination by means of asynchronous relays without needing an additional coordination between the relays is provided. However, for the method suggested in the invention, the block transmission by the relays should be sent with delays of guard time as long as the sum of channel response time and timing error. Furthermore, in the related method, depending on the random selection of the relays, the diversity gain expected to be observed is not the highest gain that can be reached with the system in all cases. In addition to these, the receiver needs to estimate the channel between the relays and itself for the equalization that it will perform in frequency domain. In this document, it is assumed that the channel will not change throughout the data communication and it is asserted that it is sufficient to estimate the channel at the destination with training sequences of length two blocks that are added before the data sequence which are sent by the relays. However the channel may change, depending on the system requirements, such as mobility of the units or frequency hopping, etc. The said invention differs from our present invention disclosed herein in terms of coding, channel estimation and data estimation.

The United States patent document no. US2009316763 discloses diversity and capacity gain by randomized codes in distributed cooperative communication systems. In the said document, each relay divides the data it receives into parallel streams, encodes with multiple-input multiple-output (MIMO) coding methods and forms the transmission signal by computing the random linear combinations of the generated new streams. Similar to the present invention disclosed herein, the relays transmit to the destination unit in a common time interval and channel. However, use of multiple receiver antennas is required in the destination unit for operation of the invention disclosed in the said document. As it is also stated in the document, the number of receiver antenna should be at least as high as the number of the relays. First of all, use of multiple antennas increases the unit cost and may cause low performance in units having small sizes. The invention disclosed in the document requires the number of data streams generated in each relay to be less than the number of relays. Satisfying the conditions for the numbers of antennas, relays, and streams, requires coordination among the relay and the destination units, and thus brings an additional communication burden, in the system. The present invention disclosed herein may work with units with multiple antennas but does not require more than one antenna in any unit. Furthermore, the receiver unit does not have to know the number of relays.

SUMMARY OF THE INVENTION

The objective of the present invention is to provide a cooperative, opportunistic relaying system and method not requiring relay coordination and relay pre-selection, which increase the possibility of the transmission of the source data to the destination with maximum diversity gain.

Another objective of the present invention is to provide an opportunistic relaying system and method not requiring relay coordination which enable the relays to perform cooperative repetition in a common channel and time interval without coordination and without requiring precise synchronization by means of the method it employs at the receiver side; and a suitable receiving method.

Another objective of the present invention is to provide a cooperative and opportunistic relaying system and method not requiring relay coordination, wherein delay and the total amount of band used are reduced by means of the relays transmitting in a common channel and time interval.

A further objective of the present invention is to provide a cooperative and opportunistic relaying system and method not requiring relay coordination wherein which units perform repetition does not have to be known at the receiver.

Another objective of the present invention is to provide a cooperative and opportunistic relaying system and method not requiring relay coordination wherein the receiver side is standard and it operates without needing information about whether relays are used or not.

DETAILED DESCRIPTION OF THE INVENTION

The system and method developed to fulfill the objectives of the present invention is illustrated in the accompanying figures, in which.

Figure 1:
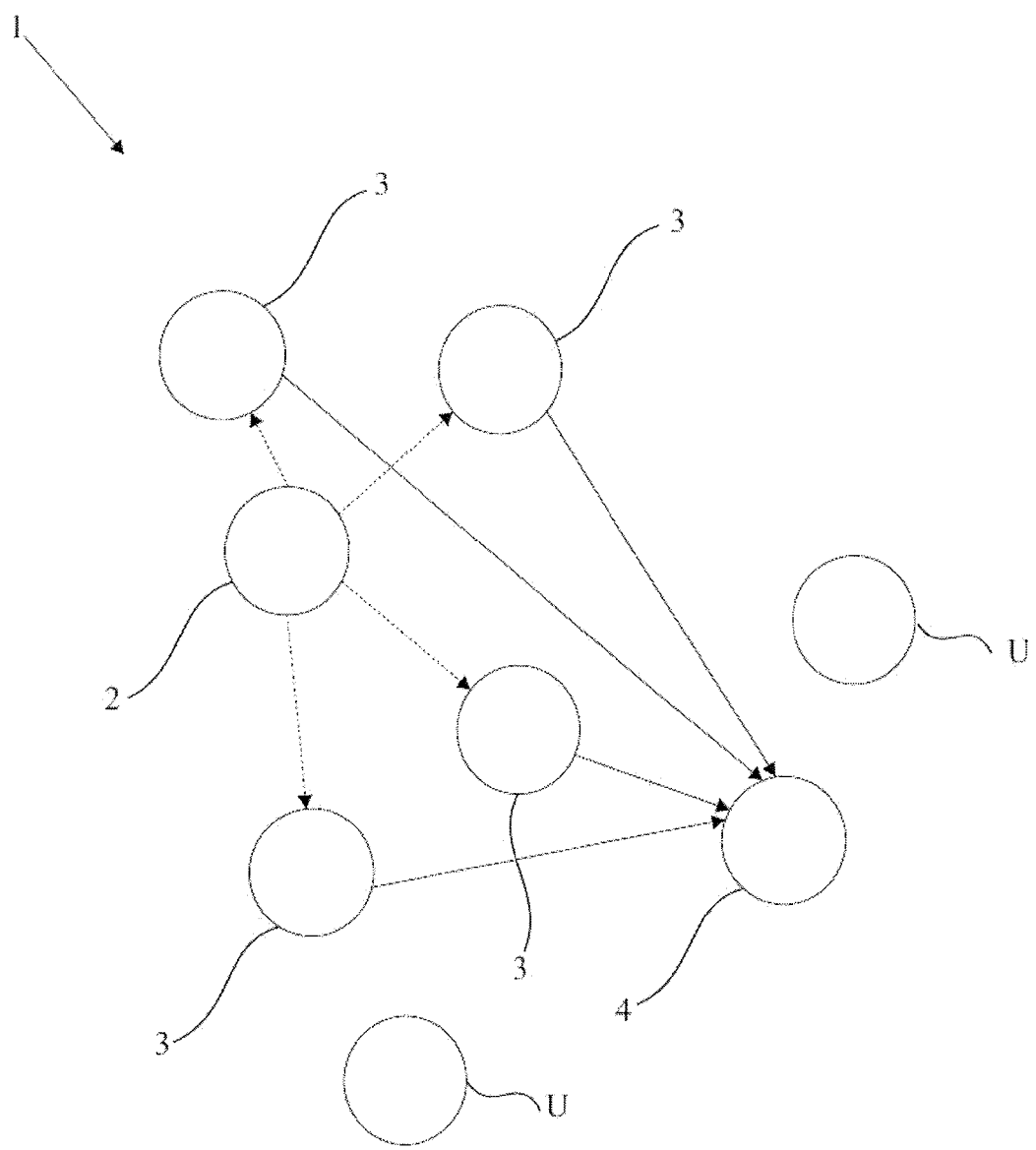
FIG. 1 is a block diagram of the system.
Figure 2:
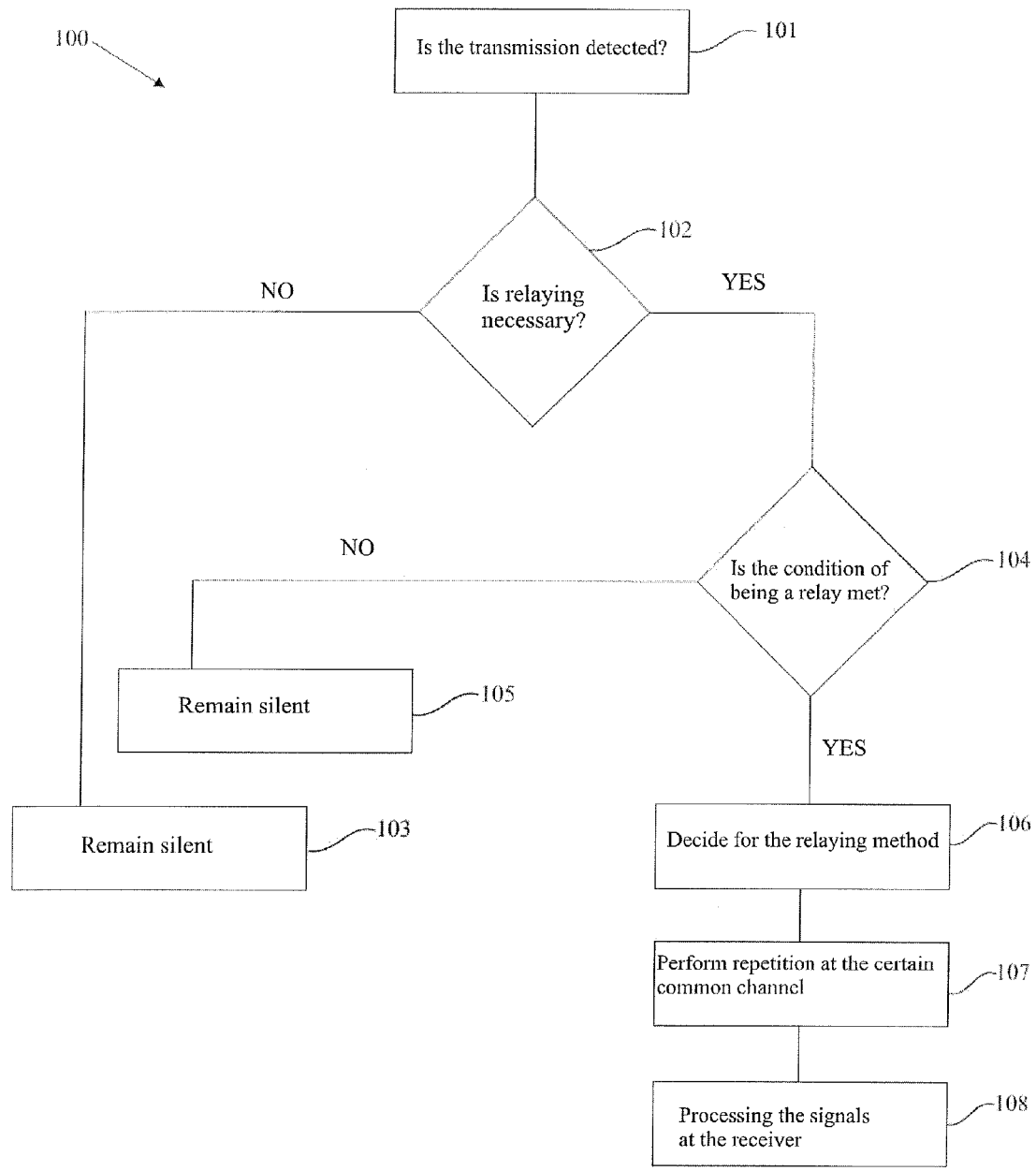
FIG. 2 is the flow chart of the relay.
Figure 3:
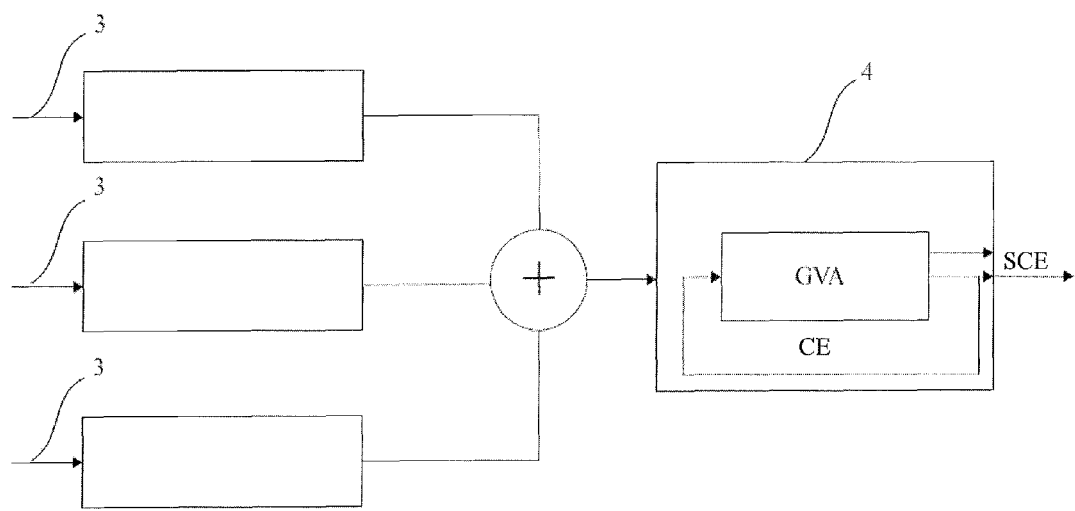
FIG. 3 is a schematic block diagram of the flow between the relay and destination.

The components shown in the figures are each given reference numerals as follows:
1. System
2. Source
3. Relay
4. Destination
U. Unit which cannot receive transmission from the source
100. Decision method used in the relay
GVA: Generalized Viterbi Algorithm
CE: Channel Estimation
SCE: Sequence and Channel Estimation The system (1), which enables the transmission to be relayed in a common channel and time interval, and the incoming signals to be processed, comprises
   a source (2) which transmits,
   at least one relay (3) which transmits the transmission that it receives from the source (2) in a joint channel and time interval, and
   at least one destination (4) which processes the signals that it receives from the relays (3).

In the inventive system (1), the transmission is relayed to the destination (4) by the opportunistic relays (3) in a common channel and time interval, and the signals coming from the relays (3) are processed at the destination (4) by a receiver structure which is developed in accordance with this situation.

In cases where the link between the source (2) and the destination (4) is insufficient, all the units except the source (2) and the destination (4) can be used as relays (3). The relays (3) start to listen to the source (2) at the first time interval in which the source (2) broadcasts, and decide to perform relaying depending on the value of a receiving quality metric of the transmission they receive from the source (2). The units (U) which cannot receive transmission from the source remain silent throughout the relaying without requiring any coordination.

The units, which decide to be relays (3), transmit the transmission of the source (2) to the destination (4) in a common time interval. This common time interval is determined according to a rule defined by the system.

In the inventive system (1), the decision of the relay (3) to perform relaying is made in view of the received power, signal-to-noise ratio (SNR) or the other metrics depending on coding and modulation (LLR (Log-likelihood Ratio), CRC (Cyclic Redundancy Check), etc).

In practice, the unit's local clocks failing to be perfectly synchronous, and each unit broadcast reaching the destination (4) with a different propagation delay, cause inter symbol interference (ISI) for the transmissions that are intended to arrive at the receiver synchronously. Therefore, the destination (4) in the system (1) comprises a special receiver structure developed for processing the signal coming from the relays (3). This receiver structure does not require the ISI channel formed at the destination (4) to be known in advance. Due to the instantaneously varying nature of the conditions in the wireless communication networks comprised of mobile units, it is not possible to know in advance the channel formed at the destination (4).

In the inventive system (1), in order to reduce the performance loss arising from the inter symbol interference (ISI), blind channel equalization techniques are used instead of methods based on long training sequences. Thus, decrease in communication efficiency due to long training sequences is prevented.

In the preferred embodiment of the inventive system (1), blind channel estimation, wherein Generalized Viterbi Algorithm (GVA) is employed, is used in the receiver.

The Generalized Viterbi Algorithm (GVA) employed in the receiver decodes the transmission sequence while updating the channel estimates. In the said process, differing from the classical Viterbi algorithm, the number of paths selected for the state that is reached after the state transition may be more than one. Thus, the correct path is prevented from being eliminated due to the channel estimates with high error especially at the beginning of the sequence. The channel estimates are updated by accepting each state transition as a correct transition and in accordance with the sequence belonging to that transition. These updated channel values are used for calculating the cost during the next state transition and are updated again. This process continues till the end of the data sequence; and after it is performed for the last received symbol, the state with the lowest cost is selected and the channel and sequence estimates of this state are obtained as output at the destination (4). With the purpose of improving channel and sequence estimation, GVA can be iterated more than once. Each iteration may be started with the last channel estimates obtained from the previous iteration.

Joint data sequence and channel estimation with the Generalized Viterbi Algorithm may also begin with the first channel estimation that will be made from a short training sequence prefixed to the data sequence. This way, performance of the receiver structure increases.

In the inventive system, while the transmission coming from the relays (3) can be processed alone in the destination (4), it can also be processed with the transmission made by the source (2). Additionally, the source (2) can transmit again with the relays (3) in the common channel and time interval, and all the transmissions related to the information sent by the source (2) can be processed together by the destination (4).

In the inventive system (1), the units have the desired number of antennas, and while being able to use the antennas during transmission, they can also combine and process the signals received from their antennas within the receiver structure during reception.

The method (100), which is used for the relays (3) to decide to relay the source's (2) transmission and to relay it in a common channel and time interval, comprises
    the relay (3) detecting the transmission coming from the source (2)(101),
    the relay deciding whether relaying is necessary or not (102),
    if it is not necessary, the relay (3) remaining silent (103),
    if it is necessary, checking whether the condition of being a relay (3) is met or not (104),
    if it is not met, the relay (3) remaining silent (105),
    if it is met, choosing the relaying method (106),
    the relays (3) performing repetition in the common channel (107) and
    the processing of signals with the suggested receiver structure in the receiver of the destination (4) (108).

In the inventive method (100), after it is decided that relaying is "necessary", in the step of checking whether the condition of being a relay (3) is met or not (104), the decision for the relay (3) to perform relaying is made based on various metrics. These metrics can be chosen as the received power, signal-to-noise ratio (SNR) or other metrics depending on coding and modulation (LLR, CRC, etc.).

The relays (3), independent of each other, choose one of the decode & forward, amplify & forward, or similar relaying methods for repetition (106). Each one of these methods is supported by the system and at the time of decision, the method to be used for relaying is selected depending on the metrics calculated for meeting the condition of being a relay.

The relays (3) perform repeating (107) of the information that they received from the source in the certain common time interval and channel by using the relaying method that they select.

As a result of processing (108) of the transmissions received at the destination, which are made by many units and which are not completely synchronized, by means of the suggested receiver method that takes into account the impact of the resulting inter symbol interference, information is transmitted from the source (2) to the destination (4).

It is possible to develop various embodiments of the inventive cooperative, opportunistic system (1) and method (100) not requiring relay coordination. The invention can not be limited to the examples described herein and it is essentially as defined in the claims.

The invention claimed is:

1. A method for enabling a transmission to be relayed in a common channel and time interval and for processing an incoming signal, the method comprising:
    detecting a broadcast coming from a source;
    deciding whether a relaying action is necessary or not;
    remaining silent if the relaying action is not necessary;
    checking whether the condition of being a relay is met or not based on a parameter indicating the quality of a transmission that the relay received from the source;
    remaining silent if the condition of being the relay is not met;
    deciding for the relaying method if the condition of being the relay is met;
    performing repetition in a common channel by a plurality of relays; and
    processing of signals with a suggested receiver structure in a destination receiver;
    wherein processing of signals with the suggested receiver structure step is performed in the destination receiver;
    and wherein detecting, deciding, remaining silent, checking, deciding and performing repetition steps are performed in the relay.

2. The method of claim 1, wherein the decision to perform relaying is made according to the received power level or signal-to-noise ratio (SNR).

3. The method according to claim 2, wherein repetition is performed by selecting one of the relaying methods such as decode and forward, amplify and forward, or the like.

4. The method of claim 1, wherein other metrics depending on coding and modulation are also used for deciding to perform relaying.

5. The method according to claim 1, wherein repetition is performed by selecting one of the relaying methods such as decode and forward, amplify and forward, or the like.

6. A system for enabling a broadcast to be relayed in a common channel and time interval, and for processing a plurality of incoming signals at a destination, without requiring relay coordination; comprising a source which transmits a transmission signal;
    at least one relay which transmits the transmission signal that the relay receives from the source in a common channel and time interval; and
    at least one destination which processes the signals that the destination receives from the relays;
    a receiver which does not require the inter symbol interference channel formed at the destination to be known in advance by the receiver and processes the signals coming from the relays using blind channel estimation wherein Generalized Viterbi Algorithm (GVA) is employed.

7. The system of claim 6, wherein the receiver is based on the Generalized Viterbi Algorithm (GVA) which can use a training sequence prefixed to the data sequence for joint data and channel estimation.

8. The system of claim 6, wherein at the destination, the transmissions made by the source are processed together with the transmissions coming from the relays.

9. The system according to claim 6, wherein the source can also transmit with the relays in the common channel and time interval, and all the transmissions, related to the information sent by the source are processed together by the destination.

10. The system of claim 6, wherein the units comprise desired number of antennas and that while being able to use the antennas during transmission, they can also combine and process the signals received from their antennas within the receiver structure during receiving.

* * * * *